Sept. 7, 1948.  A. H. PATTISON  2,448,732
FLEXIBLE DRIVE COUPLING
Filed Dec. 17, 1946

INVENTOR.
Arthur H. Pattison
BY
Mawhinney & Mawhinney
Attorneys

Patented Sept. 7, 1948

2,448,732

UNITED STATES PATENT OFFICE 2,448,732

FLEXIBLE DRIVE COUPLING

Arthur Henry Pattison, Coventry, England, assignor to Arthur Pattison Limited, Coventry, England Application December 17, 1946, Serial No. 716,858
In Great Britain March 22, 1946

5 Claims. (Cl. 64—27)

This invention relates to a flexible drive coupling between a hub and an annular plate-like member—for example, between the hub and the inner portion of a flexible spider forming part of the driving disc of a plate clutch.

The main object is to provide a simple means by which torsional vibrations will be absorbed.

According to the invention, the hub has a radial flange with a circle of holes in it in which are disposed compressed rubber bushes the bores of which receive axially-extending pins carried by the plate-like member.

The term "rubber" is used herein to include artificial or natural rubber. The term "pin" is used in a generic sense to include rivets, studs, bolts and the like.

Preferably the plate-like member is resiliently axially located directly against one radial face of the flange, the bushes being axially compressed against the member by means of the pins.

According to a further feature of the invention, the hub has a radial flange against one face of which the plate-like member is axially located by a ring which is slidingly mounted on the hub but held against rotation with respect thereto, the ring and flange each having in it a circle of axially-extending holes which are aligned with one another and contain compressed rubber bushes which are axially compressed against the member by through pins carried by the member and serving thereby resiliently to locate the ring axially.

Preferably the rubber bushes have flanges at their ends remote from the plate-like member to engage the adjacent radial face of the flange (and of the hub ring, if used).

In the accompanying drawings—

Figure 2:
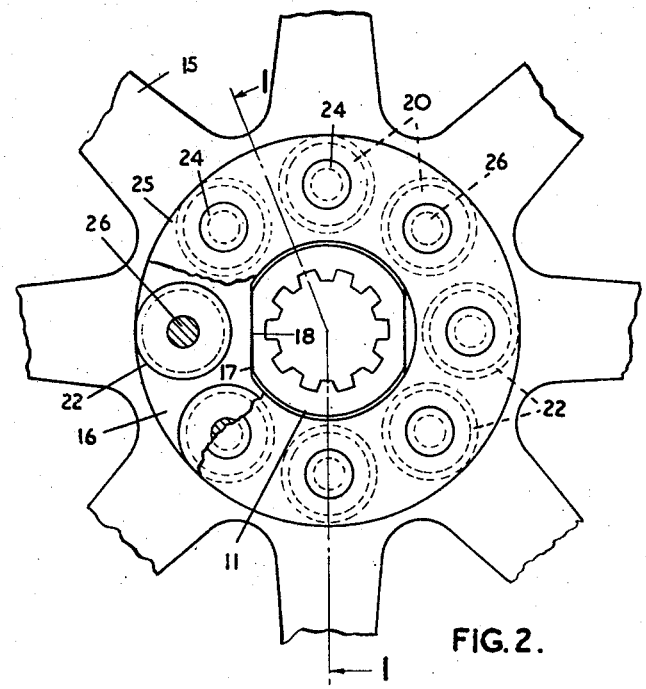
Figure 1:
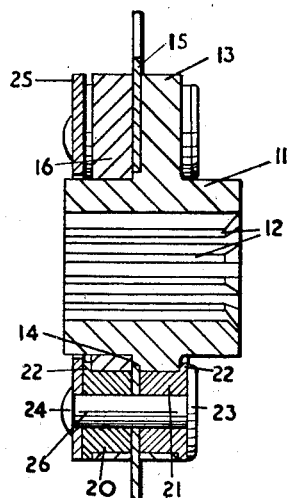

Figure 1 is a sectional elevation, taken mainly on the line 1—1 of Figure 2, of a hub coupled to the inner portion of a clutch disc according to the invention; and Figure 2 is a fragmentary end elevation thereof with part of the securing ring broken away.

The drawings show a hub 11 internally splined at 12 in the usual manner to slide upon a driven clutch shaft (not shown), and it is formed between its ends with a radially-extending flange 13. At one radial face of the flange there is provided a step 14 to receive the inner periphery of the flexible annular clutch disc 15 with a requisite clearance. The radially-inner portion of the clutch disc is located against this radial face of the flange by a hub ring 16 slidingly mounted on the hub as shown. The hub ring is held against rotation thereon by having a non-circular bore 17 to mate with the corresponding non-circular portion 18 of the hub.

Both the flange 13 and the hub ring 16 have similar circles of equi-spaced holes in them, eight holes in the present instance, in which are mounted rubber bushes 20, 21, provided with flanges 22 which abut the radial faces of the flange 13 and hub ring 16 remote from the clutch disc, the adjacent or inner ends of the rubber bushes bearing upon opposite faces of the inner portion of the clutch disc. The rubber bushes are held under compression, so as fully to occupy the holes, by means of rivets having heads 23 at one end, of an area approximately equal to that of the adjacent bush flanges 22, and riveted as shown at 24 at the other end to engage a securing ring 25. The stems 26 of the rivet pins extend through holes provided in the inner portion of the clutch disc with a minimum of clearance.

Thus, not only do the through rivets or pins maintain the rubber bushes axially compressed against the radially-inner portion of the clutch disc and thus resiliently locate the latter axially, by engaging through the bush flanges 22 both the hub flange 13 and the hub ring 16, but they transmit torque between the clutch disc and the hub through the intermediary of the rubber bushes.

In this way a very simple and satisfactory form of flexible drive coupling is inexpensively provided, and one, moreover, which is capable of absorbing very heavy and sudden variations in the torque to be transmitted.

What I claim as my invention and desire to secure by Letters Patent of the United States is:

1. A flexible drive coupling between a hub and an annular plate-like member, including a radial flange fast with the hub, a ring which is slidingly mounted on the hub but held against rotation with respect thereto, the plate-like member being interposed between the ring and the flange, the ring and flange each having a circle of axially-extending holes which are aligned with one another, a set of compressed rubber bushes in each circle of holes, and pins extending through the bushes and carried by the member, the pins serving to axially compress the bushes against the member.

2. A flexible drive coupling between a hub and an annular plate-like member, including a radial flange fast with the hub, the flange being stepped on one face to receive the inner periphery of the plate-like member, a ring which is slidingly mounted on the hub but held against rotation with respect thereto, the ring axially locating the plate-like member in the stepped face of the flange, the ring and flange each having a circle of axially-extending holes which are aligned with one another, a set of compressed rubber bushes in each circle of holes, and through pins in the bushes carried by the member and serving to axially compress the bushes against the member.

3. A flexible drive coupling between a hub and an annular plate-like member, including a radial flange fast with the hub, a ring which is slidingly mounted on the hub but held against rotation with respect thereto, the ring axially locating the plate-like member against one radial face of the flange, the ring and flange each having a circle of axially-extending holes which are aligned with one another, a set of compressed rubber bushes in each circle of holes, the bushes having flanges at their outer ends engaged with the outer radial faces of the flange and ring, respectively, through pins in the bushes carried by the member, and means connecting the ends of the pins with the adjacent outer faces of the bush flanges and serving to axially compress the bushes against the member and to resiliently locate the ring axially.

4. A flexible drive coupling, according to claim 3, characterized in that said means includes heads on the pins engaging the flanges of the bushes of one set, and a ring, riveted to the pins, engaging the flanges of the bushes of the other set.

5. A clutch disc including a hub having a radial flange fast therewith, an annular plate-like member disposed on the hub adjacent one face of the flange, a ring which is slidingly and drivingly mounted on the hub against the other face of the plate-like member, the ring and flange each having a circle of axially-extending holes which are aligned with one another, a set of compressed rubber bushes in each circle of holes, the bushes having flanges at their outer ends engaged with the outer radial faces of the flange and ring, respectively, and pins carried in holes in the plate-like member the pins extending through the bushes and being connected with the outer faces of the bush flanges to axially compress the bushes against the member.

ARTHUR HENRY PATTISON.

REFERENCES CITED

The following references are of record in the file of this patent:

UNITED STATES PATENTS

| Number | Name | Date |
|---|---|---|
| 2,270,583 | Forton | Oct. 13, 1942 |
| 2,299,010 | Doman | Jan. 20, 1942 |